(12) United States Patent
Tagg

(10) Patent No.: US 6,625,620 B1
(45) Date of Patent: Sep. 23, 2003

(54) METHOD AND APPARATUS FOR THE MANAGEMENT OF FILE ATTACHMENTS IN A GROUPWARE ORIENTED SYSTEM

(75) Inventor: Bradley S. Tagg, Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/557,070

(22) Filed: Apr. 21, 2000

(51) Int. Cl.[7] .......................... G06F 17/00; G06F 15/00
(52) U.S. Cl. ................... 707/200; 715/500.1; 715/514; 715/516
(58) Field of Search ........................... 707/1–2, 7, 200, 707/500, 514, 515–517; 715/500.1, 514–516

(56) References Cited

U.S. PATENT DOCUMENTS 5,388,196 A * 2/1995 Pajak et al. ................. 345/751
5,754,782 A    5/1998 Masada
5,765,144 A * 6/1998 Larche et al. ................. 705/38
6,157,941 A * 12/2000 Verkler et al. ............... 709/202
6,438,559 B1 * 8/2002 White et al. ............. 707/103 R

* cited by examiner

Primary Examiner—Alford Kindfred
(74) Attorney, Agent, or Firm—Scully, Scott, Murphy & Presser; William E. Schiesser

(57) ABSTRACT

A method and network for managing attachments in applications. The method comprises the steps of creating a plurality of attachment databases to contain said attachments; and embedding an attachment engine within said applications for creating, deleting, and re-using said attachments in said plurality of attachment databases. The method further comprises the steps of connecting said plurality of attachment databases to each other, and performing load balancing between said plurality of attachment databases. Preferably, the method also includes the steps of archiving attachments from the attachment databases under defined conditions, and providing attachment database indexes to keep track of the attachments in the attachment databases. In addition, preferably the embedding step includes the step of embedding a respective one attachment engine within each of said applications.

12 Claims, 4 Drawing Sheets

FIG. 4
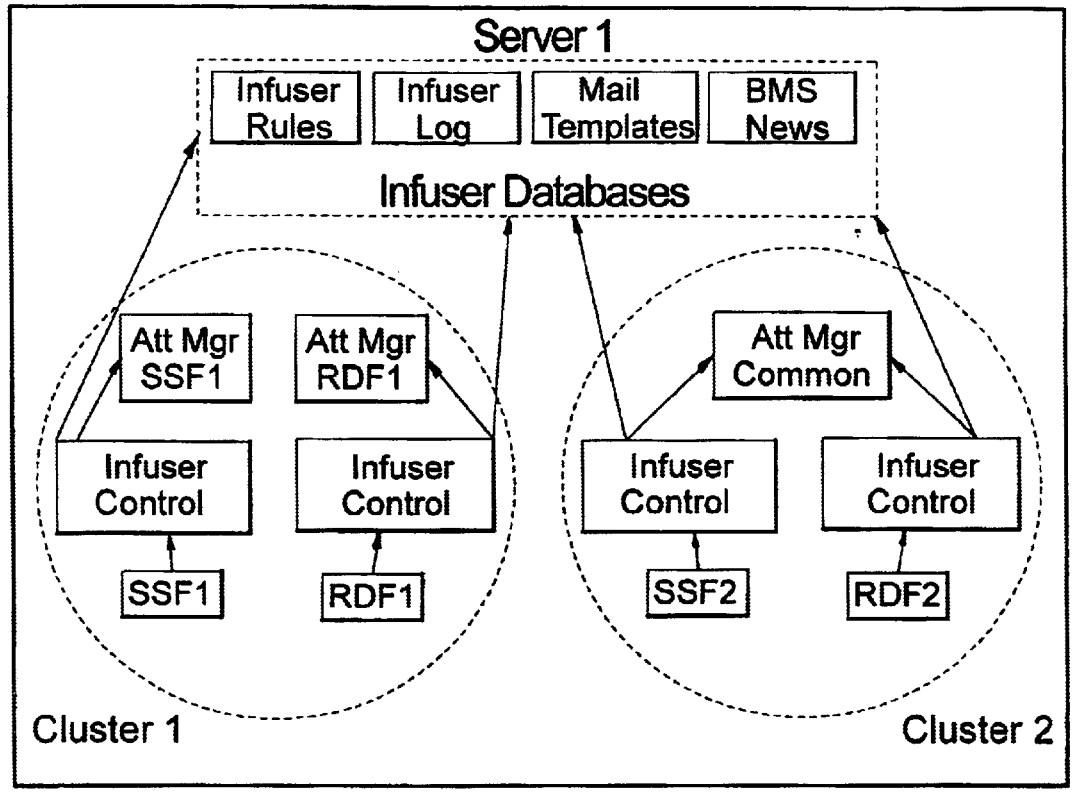
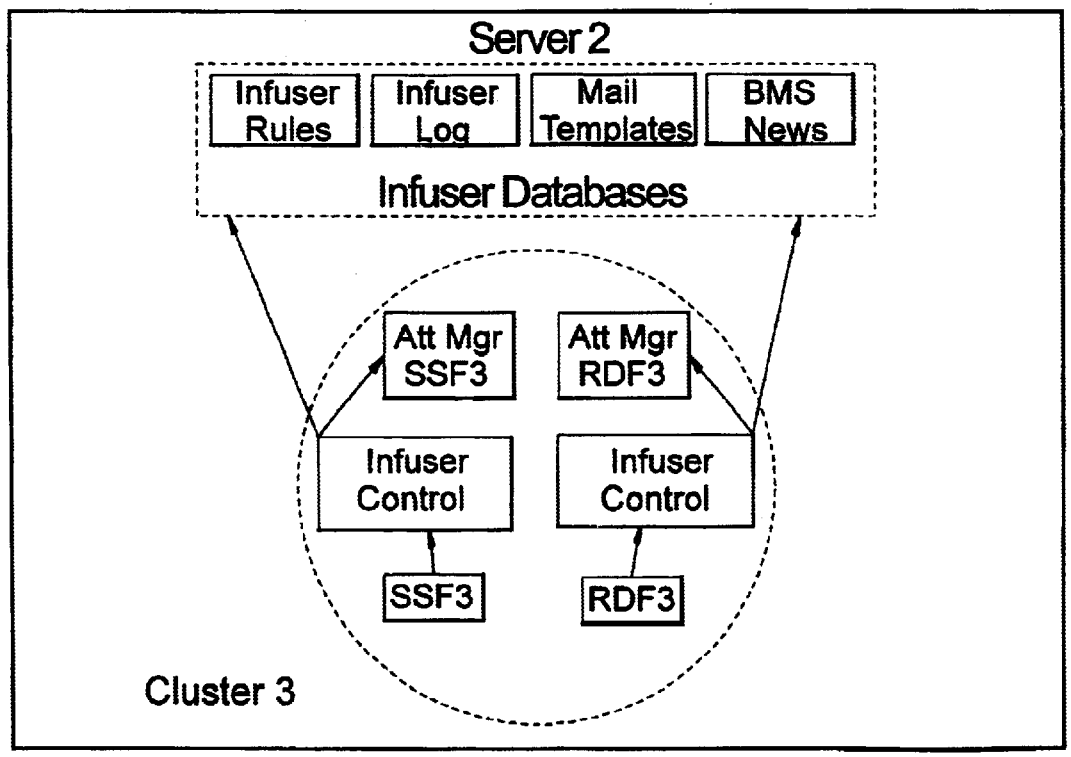

METHOD AND APPARATUS FOR THE MANAGEMENT OF FILE ATTACHMENTS IN A GROUPWARE ORIENTED SYSTEM

BACKGROUND OF THE INVENTION

This invention generally relates to the management of file attachments. More specifically, the invention relates to an attachment management software system comprising a persistent storage mechanism and a set of functions for managing file attachments.

Many computer systems and applications allow the user to attach files to documents or records within application databases. With current systems and applications, there are several difficulties related to the management of file attachments.

For example, commonly, users can attach files of any size and number, and this makes the database grow non-linearly and unpredictably. Also, typically, users who wish to attach the same file attachment in different applications must go to each application and attach a unique copy of the file in each of the applications.

In addition, the security of file attachments is supported by the application being used to perform the attachment. Further, when users make local copies of applications, their network costs are higher due to the copying of attachment files. Other disadvantages of current systems are that attachments made directly within applications cannot be accessed or searched against from outside the application, and that attachments made directly within applications cannot have attributes stored with them defining the attachment (description, use, ownership).

SUMMARY OF THE INVENTION

An object of this invention is to make the management of file attachments more robust.

Another object of the present invention is to provide the ability to allow unlimited numbers of attachments that do not affect the application that is used to make the attachment.

A further object of this invention is to provide advanced load balancing, archiving, pruning, searching and categorization of attachments.

These and other objectives are attained with a method of managing attachments in applications, comprising the steps of creating a plurality of attachment databases to contain said attachments, and embedding an attachment engine within said applications for creating, deleting, and re-using said attachments in said plurality of attachment databases. The method further comprises the steps of connecting said plurality of attachment databases to each other, and performing load balancing between said plurality of attachment databases.

Preferably, the method also includes the steps of archiving attachments from the attachment databases under defined conditions, and providing attachment database indexes to keep track of the attachments in the attachment databases. In addition, preferably the embedding step includes the step of embedding a respective one attachment engine within each of said applications.

The invention allows software users to store attachments, retrieve them, make local replicas of them and to archive or prune them. All of these functions use a data store for the attachments that is separate from the storage used by the software application that the attachment management functions is called from. The invention also employs a load balancing mechanism that allows administrators to balance the use of several attachment stores by implementation of a load balancing algorithm. The algorithms and functions provided allow for the creation of local replicas that support use and management of attachments while disconnected from the network.

The invention solves the above-discussed problems through the implementation of a database, such as a Lotus Notes database, which is used to contain attachments. Database forms and views are used to capture information about the attachment (description, type, use, ownership, searchable fields). Additionally an attachment engine is embedded within applications which enable themselves to this attachment management. The attachment engine supports the simple actions of creating, deleting and re-using an existing attachment. The embedded attachment engine communicates with the attachment database for storing and retrieving attachments.

Each attachment database can be connected to other attachment databases through a mechanism that registers the database as belonging within a network of attachment databases. Load balancing algorithms are employed to shift attachments between the attachment databases for optimal performance. The applications using the attachment management mechanism may be kept unaware of the physical location of the attachment. Functions within the attachment databases allow for the database to be defined as playing different roles in the network of attachment databases. An attachment database can be defined as a target for attachments or as a hub defining what other attachment databases make up the network of attachment databases.

Forms and agents are implemented to define archiving and pruning policies which act on attachments automatically. Linkage functions allow the archiving of attachments to host based systems and storage. Attachments are treated as files and sent to the host for archiving into host datasets using the hierarchical storage manager application concepts. Administrators are able to use the forms and agents to automatically manage how attachments are handled.

Each attachment is supported by a security model that associates the originator of the attachment as the owner, with the ability for the owner to specify other users to have access.

Replication features may be used to support local use of attachments. The invention may include extensions to these base features that allow a user to more granularly affect what is replicated to a local replica (users are provided with a form that allows them to indicate which attachments they want to replicate locally).

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 shows several configurations that may be used in the practice of this invention.

DETAILED DESCRIPTION OF THE PREFERRED EMBODIMENTS

Figure 1:
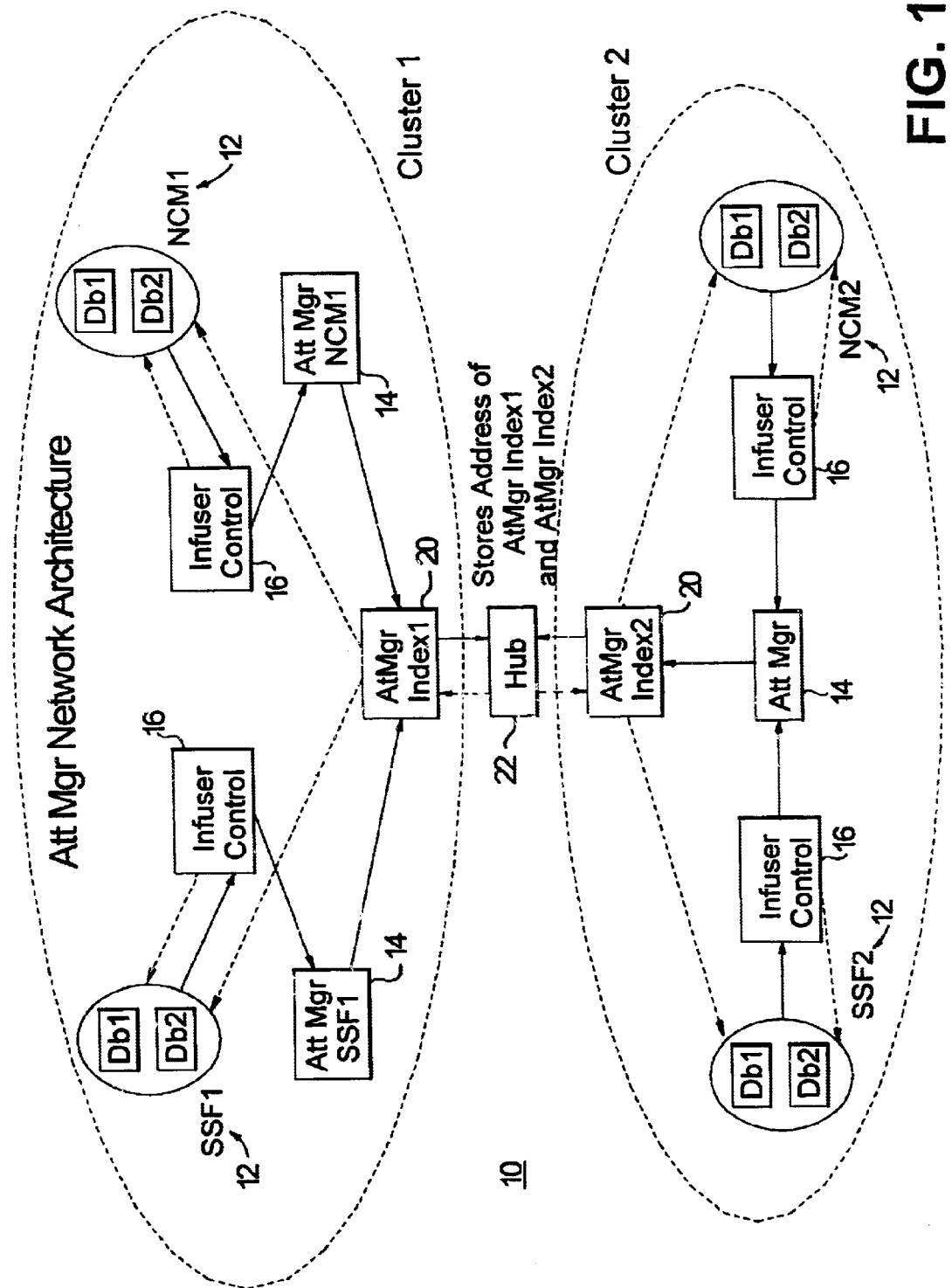
FIG. 1 shows an attachment manager network architecture embodying this invention.

FIG. 1 illustrates attachment manager network 10 comprising a plurality of source applications 12, a plurality of attachment managers 14, a plurality of infuser controls 16, a plurality of attachment manager indexes 20, and a hub 22. Each source application includes a plurality of databases Db.

The source applications 12 may be standard source applications; and, for example, these applications may be designed and operated to store, retrieve, process or analyze data from associated databases. Source applications are well known in the art, and any suitable source applications may be used in the practice of this invention.

Attachment managers 14 are provided to store file attachments and to store information about those attachments. This information may be, for example, description, type, use, ownership, and searchable fields. The attachment managers support, among other functions, the actions of creating, deleting and re-using an existing attachment.

The infuser controls 16 are attachment manager configuration mechanisms, and each infuser control establishes and controls the relationship between one of the source applications and an associated attachment manager. For example, the infuser controls may be used for, among other purposes, archiving, pruning, searching and categorization of attachments.

As shown in cluster 1 of FIG. 1, each source application may have its own attachment manager, with an infuser control controlling the relationship between the source application and its attachment manager.

Alternatively, as illustrated in cluster 2 of FIG. 1, source applications may share, or have a common, attachment manager.

The attachment manager indexes 20 are provided to keep track of the attachment managers. More specifically, each attachment manager is bound to an index when the attachment manager is created, and each attachment manager index keeps track of all the attachment managers that are bound to it. Each source application has access to all of the attachment managers in the network—and thus to all of the attachment files in those attachment managers—via one or more of the attachment manager indexes. Preferably, the specific data held in each attachment manager index is user defined.

The hub 22 is used to link together the attachment manager indexes so that data and attachment files can be transmitted between those indexes. Preferably, the specific functions performed by the hub are also user defined.

Figure 2:
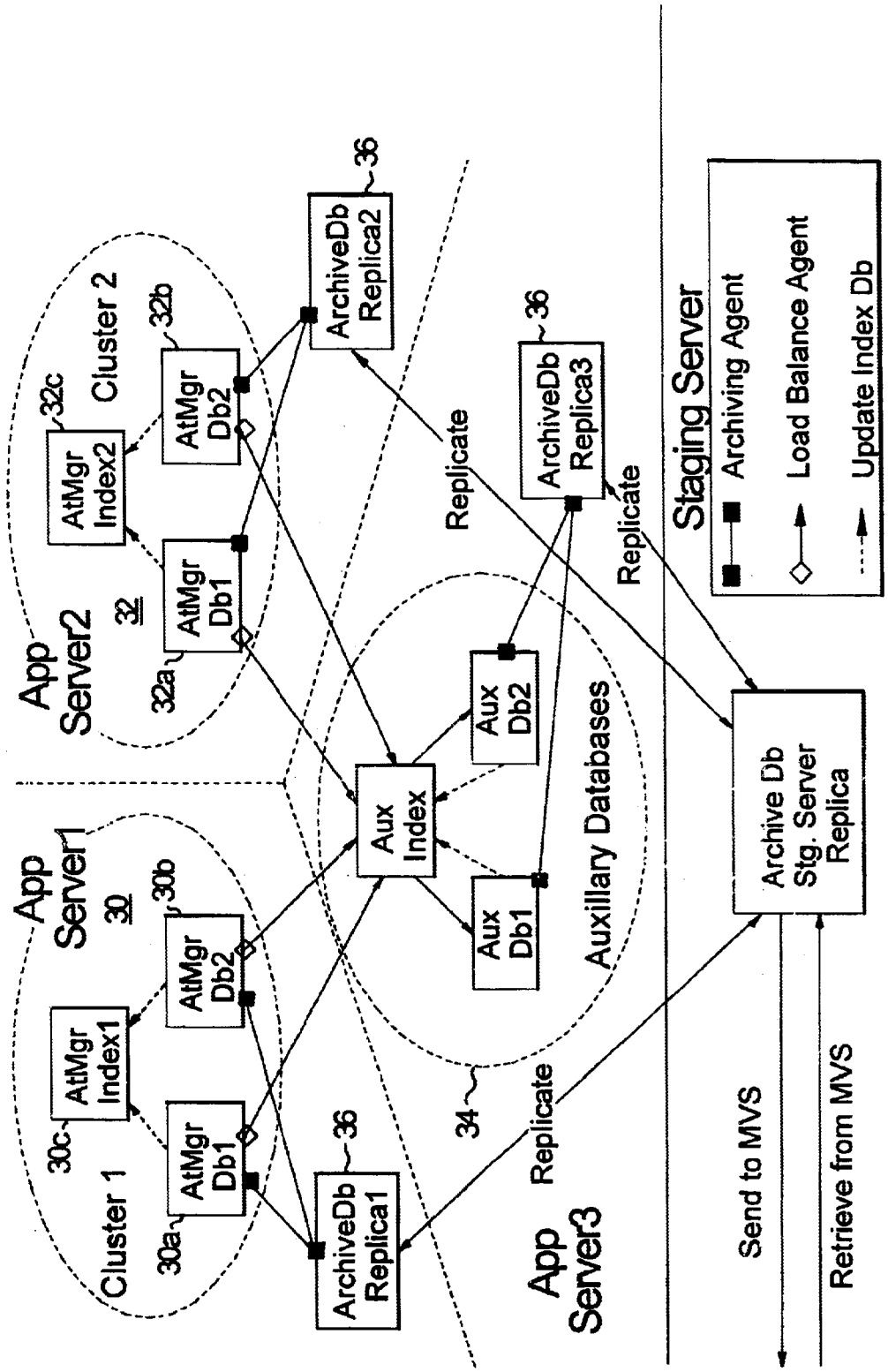
FIG. 2 illustrates load balancing and archiving features of the present invention.

FIG. 2 generally illustrates the load balancing and archiving features of the present invention. More specifically, FIG. 2 shows an architecture comprising a first application server 30, a second application server 32, a group 34 of auxiliary databases, and a group of archiving databases 36. Application server 30 includes attachment managers 30a and 30b and attachment manager index 30c; similarly, application server 32 includes attachment managers 32a and 32b and attachment manager index 32c; and the group 34 of auxiliary databases includes databases 34a and 34b and an auxiliary index 34c.

A primary objective of the load balancing and archiving architecture is to take the storage of the attachments out of the control of the source applications, and to provide the ability to move the attachments around the network.

The auxiliary databases are used to establish a set of attachment managers. Moreover, all of the attachment managers in Clusters 1 and 2 of FIG. 2 are able to create relationships with the auxiliary databases.

A load balancing agent resides in each attachment manager database and, under defined circumstances, pushes the attachment out to the auxiliary attachment managers. For example, the transfer of the attachments to the auxiliary attachment mangers may be based on physical limitations of the attachment managers, and, in particular, may be done when the amount of data in an attachment manager approaches or reaches a threshold. Also, the transfer of an attachment to the auxiliary attachment managers may be based on the amount of time since an attachment was looked at; and, for instance, the attachments that have not been looked at for the longest, may be pushed to the auxiliary attachment managers.

Archiving provides the user with the ability to transfer attachments to low, or lower, cost data storage devices. Preferably, archiving is both user driven and policy driven. In particular, prefereably archiving from the attachment managers of the application servers is done under user defined conditions, and archiving from the auxiliary databases is done under procedures established by the system administrator in a policy statement.

As attachments are transferred among the various archives and auxiliary databases, indexes and pointers are established and maintained to keep track of the locations of those attachments. These indexes are used to keep pointers, attribute information and other pertinent data in synchronization and to let the users know where all the attachments are.

Figure 3:
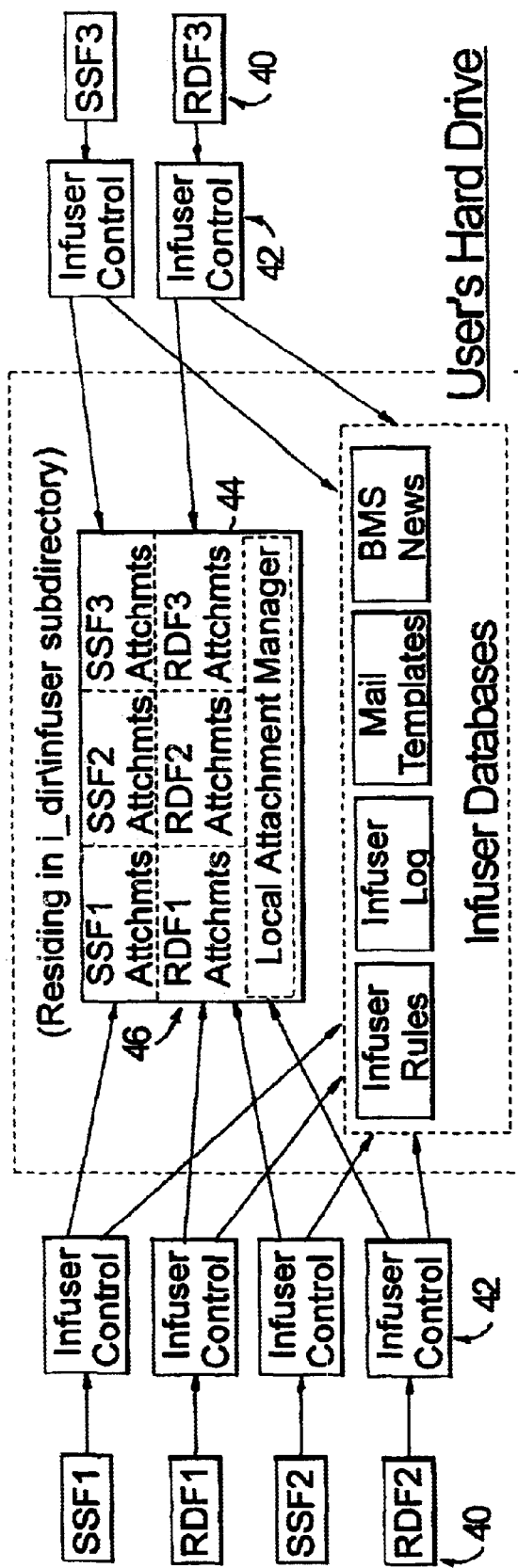
FIG. 3 depicts how various elements of an embodiment of this invention may be set-up on a user's hard drive.

FIG. 3 illustrates how various elements of the invention may be set-up on a user's hard drive. More specifically, FIG. 3 shows six source applications 40, six infuser controls 42 and a local attachment manager 44. Attachment manager 44 stores file attachments and information about those attachments. The embodiment of the attachment manager shown in FIG. 3 stores file attachments for all six of the source applications 40 shown in the Figure; and to facilitate this, the attachment manager has six separate files 46, one for each source application.

Each infuser control is used to establish and to control the relationship between a respective one of the source applications and the associated attachment manager.

With the preferred embodiment of the invention, attachments can be moved from the user's hard drive to the network. For instance, one user may obtain a particular attachment and place it in a file attached to a particular record in a source application. That attachment can then be transmitted from that user's hard drive to the network, where other users have access to the attachment.

FIG. 4 illustrates several configurations that may be used in the practice of this invention. In particular, in Cluster 1 of the Figure, two source applications are associated with two attachment managers; while in cluster 2 of the Figure, two source applications are associated with a common attachment manager. The attachment managers of clusters 1 and 2 of FIG. 4 share a common server, which contains infuser databases. In Cluster 3 of FIG. 4, like cluster 1, each of two source applications is associated with a respective one attachment manager. The attachment managers of cluster 3 of FIG. 4 are associated with one server, which they do not share with any other cluster and which contains the infuser databases.

The data model and functions of this invention have been implemented in Lotus Notes using forms, views and Lotus Script. Connections to OS\390 for the storage of archived attachments was implemented via an FTP procedure, whereby attachments are sent as files between Lotus Notes and OS\390. Componentry on OS\390 is used to receive the attachments as files and to store them in OS\390 datasets following a naming convention for the management of file attachments.

The preferred embodiment of the invention, as described above, has a number of important advantages. For example, a separate data store is used to handle attachments, with this data store actually being one data store in a connected web of data stores that are defined with relationships that support balancing the number and size of attachments across the web of attachments stores. Load balancing algorithms are implemented that push the attachment to storage layers that are less costly storage points. Archiving and pruning functions are implemented through the use of policies, which can be instantiated by administrators to define what types of files should be archived\pruned based on time factors.

The invention allows users to access the web of attachment stores to find and attach the same physical attachment. This is done via the use of a "pointer to an attachment" mechanism. The invention implements an attachment security layer that separates the security management of attachments away from the application where the attachment is made. The invention allows the user to direct which attachments they want to copy, provides attachment search capabilities that work directly against the attachment stores, and provides the ability to describe each attachment with a record which is kept with the attachment.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of managing attachments in applications, comprising the steps of:

creating a plurality of attachment databases to contain said attachments;

embedding an attachment engine within said applications for creating, deleting, and re-using said attachments in said plurality of attachment databases;

connecting said plurality of attachment databases to each other;

providing each of the attachment engines with a load balancing agent; and using the load balancing agents to perform load balancing between said plurality of attachment databases.

2. A method according to claim 1, further comprising the step of archiving attachments from the attachment databases under defined conditions.

3. A method according to claim 1, wherein the embedding step includes the step of embedding a respective one attachment engine within each of said applications.

4. A method according to claim 1, further comprising the step of providing attachment database indexes to keep track of the attachments in the attachment databases.

5. A network for managing attachments in applications, comprising:

a plurality of attachment databases to contain said attachments;

an attachment engine embedded within said applications for creating, deleting, and re-using said attachments in said plurality of attachment databases; and means connecting said plurality of attachment databases to each other;

wherein each of the attachment engines includes a load balancing agent, and the load balancing agents perform load balancing between said plurality of attachment databases.

6. A network according to claim 5, further comprising means for archiving attachments from the attachment databases under defined conditions.

7. A network according to claim 5, wherein a respective one attachment engine is embedded within each of said applications.

8. A network according to claim 5, further comprising attachment database indexes to keep track of the attachments in the attachment databases.

9. A program storage device readable by machine, tangibly embodying a program of instructions executable by the machine to perform method steps for managing attachments in applications, said method steps comprising:

creating a plurality of attachment databases to contain said attachments;

embedding an attachment engine within said applications for creating, deleting, and re-using said attachments in said plurality of attachment databases;

connecting said plurality of attachment databases to each other;

providing each of the attachment engines with a load balancing agent; and using the load balancing agents to perform load balancing between said plurality of attachment databases.

10. A program storage device according to claim 9, wherein said method steps further comprise the step of archiving attachments from the attachment databases under defined conditions.

11. A program storage device according to claim 9, wherein the embedding step includes the step of embedding a respective one attachment engine within each of said applications.

12. A program storage device according to claim 9, wherein said method steps further comprise the step of providing attachment database indexes to keep track of the attachments in the attachment databases.

* * * * *